US008854542B1

(12) United States Patent
Ilan et al.

(10) Patent No.: US 8,854,542 B1
(45) Date of Patent: Oct. 7, 2014

(54) DISPLAY INTERFACE METHODS AND SYSTEMS

(71) Applicant: Marvell Israel (M.I.S.L) Ltd., Yokneam (IL)

(72) Inventors: Dan Ilan, Herzellia (IL); Guy Nakibly, Haifa (IL); Eilon Argov, Givat Ada (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 0 days.

(21) Appl. No.: 14/155,431

(22) Filed: Jan. 15, 2014

Related U.S. Application Data

(63) Continuation of application No. 12/980,712, filed on Dec. 29, 2010, now Pat. No. 8,643,781.

(60) Provisional application No. 61/291,532, filed on Dec. 31, 2009.

(51) Int. Cl.
*H04N 5/06* (2006.01)
*H04N 3/14* (2006.01)
*H04N 5/66* (2006.01)
*H04N 9/475* (2006.01)

(52) U.S. Cl.
CPC ... *H04N 5/06* (2013.01); *H04N 5/66* (2013.01)
USPC ........... 348/521; 348/554; 348/790; 348/518; 345/213

(58) Field of Classification Search
USPC ......... 348/521, 511, 554–558, 518, 790–793; 345/213, 699
See application file for complete search history.

(56) References Cited

U.S. PATENT DOCUMENTS

| 4,947,247 | A | * | 8/1990 | Farver | 348/160 |
| 6,067,083 | A |   | 5/2000 | Glen et al. | |
| 6,501,310 | B2 | * | 12/2002 | Takami | 327/160 |

FOREIGN PATENT DOCUMENTS

JP     07-181921  A     7/1995

* cited by examiner

*Primary Examiner* — Michael Lee

(57) ABSTRACT

Methods and systems for implementing video driving circuitry are disclosed. For example, in an embodiment, a system for driving a plurality of different types of video devices is disclosed. The system includes, for example, a System on a Chip (SoC) that itself includes a Liquid Crystal Display (LCD) controller circuit configured to generate digital video data, a first synchronization signal for controlling a first characteristic of the digital video data, and a second synchronization signal for controlling a second characteristic of the digital video data. The SoC further includes a delay circuit configured to variably delay the first synchronization signal and the second synchronization signal relative to the digital video data to generate a delayed first synchronization signal and a delayed second synchronization signal.

20 Claims, 2 Drawing Sheets

DISPLAY INTERFACE METHODS AND SYSTEMS

INCORPORATION BY REFERENCE

This is a continuation of U.S. application Ser. No. 12/980,712, filed Dec. 29, 2010, which claims the benefit of U.S. Provisional Application No. 61/291,532, filed Dec. 31, 2009. The disclosures of the applications referenced above are incorporated herein by reference.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various devices, ranging from computers to DVD players to scientific instrumentation, are configured to use a display. Furthermore, oftentimes a device needs to be able to support multiple types of displays. For example, in order to be competitive, a laptop computer typically needs to support its built-in screen as well as various digital and analog displays, such as a desktop CRT or LCD display, or a projection display. Other devices have similar requirements to be compatible with multiple different types of displays.

The large number of different displays available to consumers, however, often use incompatible standards. Digital interface standards and analog interface standards are so dissimilar that some manufacturers conventionally use separate controllers for separate interface standards. Other manufactures have resorted to using a single display controller with a host of electronic "glue" to make the single controller serve multiple displays. Such approaches tend to be costly and therefore undesirable in a highly-competitive market.

SUMMARY

Aspects of the disclosure provide a System on a Chip (SoC) for driving a plurality of different types of video devices. In an embodiment, the SoC includes a Liquid Crystal Display (LCD) controller circuit configured to generate digital video data, a first synchronization signal for controlling a first characteristic of the digital video data, and a second synchronization signal for controlling a second characteristic of the digital video data. The SoC further includes a delay circuit configured to variably delay the first synchronization signal and the second synchronization signal relative to the digital video data to generate a delayed first synchronization signal and a delayed second synchronization signal.

Aspects of the disclosure also provide a method for driving a plurality of different types of video devices. In an embodiment, the method includes generating on a System on a Chip (SoC) digital video data, a first synchronization signal, and a second synchronization signal. The first synchronization and the second synchronization signals correspond to the digital video data. Further, the method includes delaying the first synchronization signal and the second synchronization signal relative to the digital video data to generate on the SoC a delayed first synchronization signal and a delayed second synchronization signal.

Aspects of the disclosure provide a system. The system includes a Liquid Crystal Display (LCD) panel, and integrated circuits for generating video signals for the LCD panel to display. The integrated circuits include a LCD controller circuit configured to generate digital video data, a first synchronization signal for controlling a first characteristic of the digital video data, and a second synchronization signal for controlling a second characteristic of the digital video data. Further, the integrated circuits include a delay circuit configured to variably delay the first synchronization signal and the second synchronization signal relative to the digital video data to generate a delayed first synchronization signal and a delayed second synchronization signal. The LCD panel can display any suitable video signal. In an example, the LCD panel is configured to display a Video Graphic Array (VGA) compliant video signal. In another example, the LCD panel is configured to display at least one of a Digital Visual Interface (DVI) signal and a High-Definition Multimedia Interface (HDMI) signal. The delay circuit suitably delays the first synchronization signal and the second synchronization signal according to the different video signals for the LCD panel to display.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

The disclosed methods and systems below are described generally, as well as in terms of specific examples and/or specific embodiments. For instances where references are made to detailed examples and/or embodiments, it is noted that any of the underlying principles described are not to be limited to a single embodiment, but may be expanded for use with any of the other methods and systems described herein as will be understood by one of ordinary skill in the art unless otherwise stated specifically.

Figure 1:
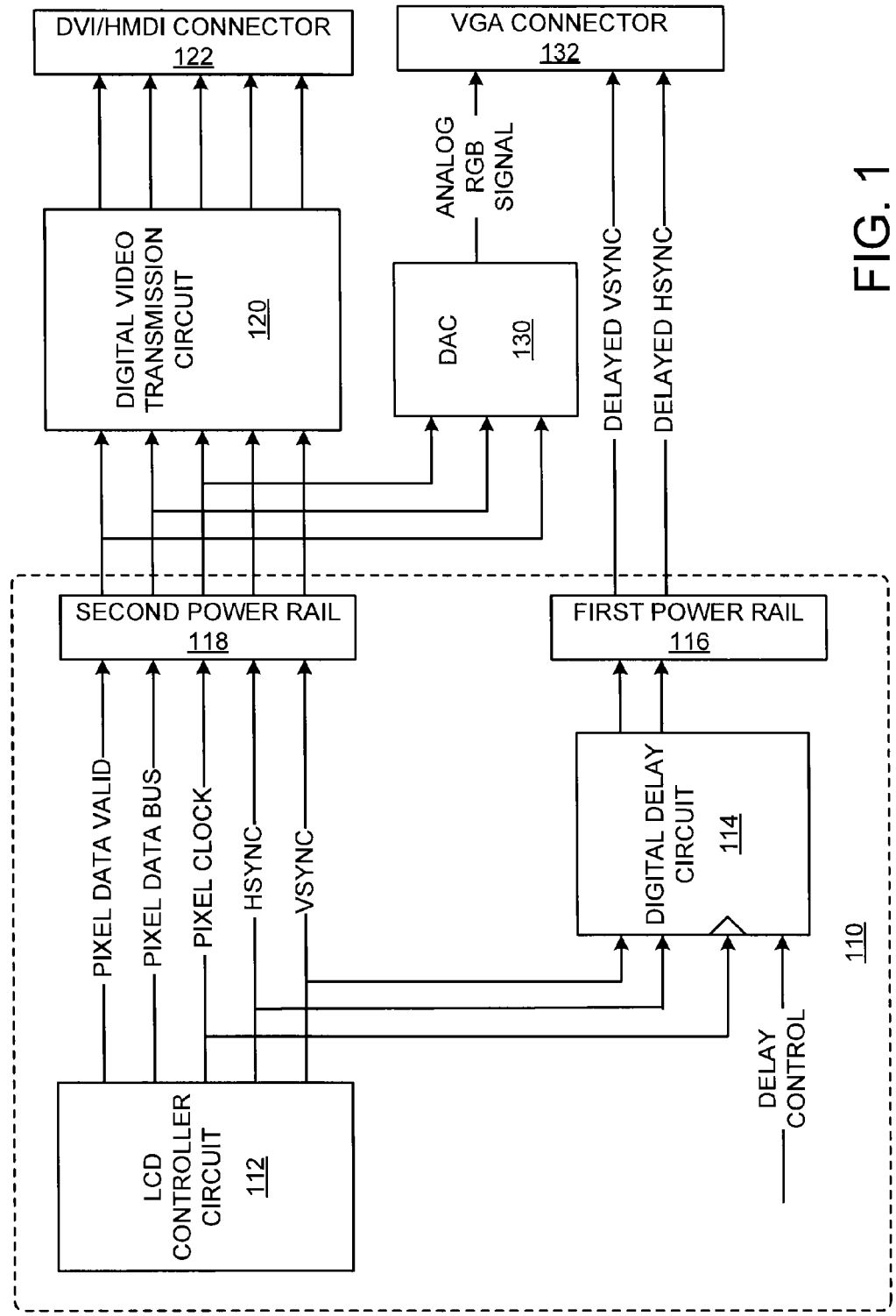
FIG. 1 depicts an example of an electronic system capable of being configured to drive both a digital and an optional analog display.

FIG. 1 depicts an example of an electronic system suitable for being configured to drive both a digital display and an optional analog display. As seen in FIG. 1, the electronic system, which in the example is fabricated on a Printed Circuit Board (PCB) or some other suitable substrate, includes a System on a Chip (SoC) 110, a digital video transmission circuit 120 and a Digital-to-Analog Converter (DAC) 130. The SoC 110 seen in FIG. 1 includes an LCD controller circuit 112, a digital delay circuit 114, a first power rail circuit 116 and a second power rail circuit 118. Note that FIG. 1 depicts one specific architecture. However, it is noted that other architectures may also be suitable.

In an example operation, the LCD controller circuit 112 generates a number of signals according to one of various digital video standards suitable for driving digital displays. Such suitable standards include, without limitation, the Digital Visual Interface (DVI) standard and the High-Definition Multimedia Interface (HDMI) standard. As seen in FIG. 1, the generated signals include pixel data (on the pixel data bus), a pixel data valid signal, a pixel data clock signal, a first vertical synchronization (VSYNC) signal, and a first horizontal synchronization (HSYNC) signal. The pixel data, pixel data valid signal, and pixel data clock signal can be collectively referred to as "digital video data."

In an embodiment, the LCD controller circuit 112, which is coupled to the second power rail 118 as seen, outputs the digital video data, the VSYNC signal and the HSYNC signal. The digital video data, the VSYNC signal and the HSYNC signal are received by the second power rail 118 where they are suitably "conditioned" (i.e., buffered and amplified to appropriate voltage and current levels, and with appropriate impedances) to generate conditioned digital video data, VSYNC and HSYNC signals. In an embodiment, the resulting conditioned digital video data, VSYNC and HSYNC signals have functional voltage levels, relative timing, current levels, and output impedances that are compliant with the inputs of the digital video transmission circuit 120. The digital video transmission circuit 120 is configured to receive the digital video signals VSYNC and HSYNC signals, and further condition them to be in compliance with an appropriate digital video standard, such as the DVI or HDMI standard, and then export the fully conditioned signals to an appropriate digital display. In an embodiment, the digital video transmission circuit 120 includes, for example, various suitable active or passive electrical/electronic components such as transformers, resistors, varistors, capacitors and the like.

Simultaneously, in an example, the DAC 130 receives the digital video data and converts the digital video data to analog form to derive analog video signals compliant with the Video Graphics Array (VGA) standard—or perhaps another known or later derived analog video standard.

Returning to the SoC 110, in an embodiment, as the LCD controller circuit 112 generates the above-mentioned digital video signals, the digital delay circuit 114 receives a portion of the digital video signals including the VSYNC signal, the HSYNC signal and the pixel clock. Using the VSYNC signal, the HSYNC signal and the pixel clock the digital delay circuit 114 can generate a set of delayed VSYNC and HSYNC signals that have waveforms identical to the received VSYNC and HSYNC signals but delayed by some desired amount of time. In various embodiments, the digital delay circuit 114 can delay the VSYNC and HSYNC signals according to a given setting, such as a first delay control setting that generates a delayed VSYNC signal and a delayed HSYNC signal that are both suitably delayed relative to the analog video data of the DAC 130 so as to generate a Video Graphics Array (VGA) compliant video signal—or perhaps a video signal compliant with another analog video standard.

In various embodiments, the digital delay circuit 114 is configured to support a plurality of delay settings to enable the digital delay circuit 114 to generate delayed VSYNC and HSYNC signals to complement different types of DACs. For example, a "simple" DAC with no internal delays might use a first delay setting, while a more sophisticated DAC with an onboard queue might use a second delay setting, while a third DAC capable of providing delays for VSYNC and HSYNC signals may use a third delay setting.

It is noted that, in an example, as the delayed VSYNC and HSYNC signals are generated, the delayed VSYNC and HSYNC signals are received and conditioned by the first power rail circuit 116 to produce conditioned VSYNC and HSYNC signals that have functional voltage levels, functional current levels, and appropriate impedances that are compliant with a video signal, such as a VGA compliant signal. Accordingly, when the SoC 110 is used with the analog output of the DAC, a complete analog video signal is created.

It is noted that the arrangement of components 112-118 on the SoC 110 are strategically placed on the SoC, as opposed to being placed on a PCB, in order to minimize costs in view of the current demands of electronic systems and the trend of consumer needs to be less reliant on analog video standards. For example, placing a delay circuit and a plurality of power rail circuits on an SoC comes at a very small increase in chip resources while placing a DAC off an SoC reflects a negligible increase in cost, and possibly a decrease in cost as the DAC is less likely to be needed as analog systems are phased out over time.

Figure 2:
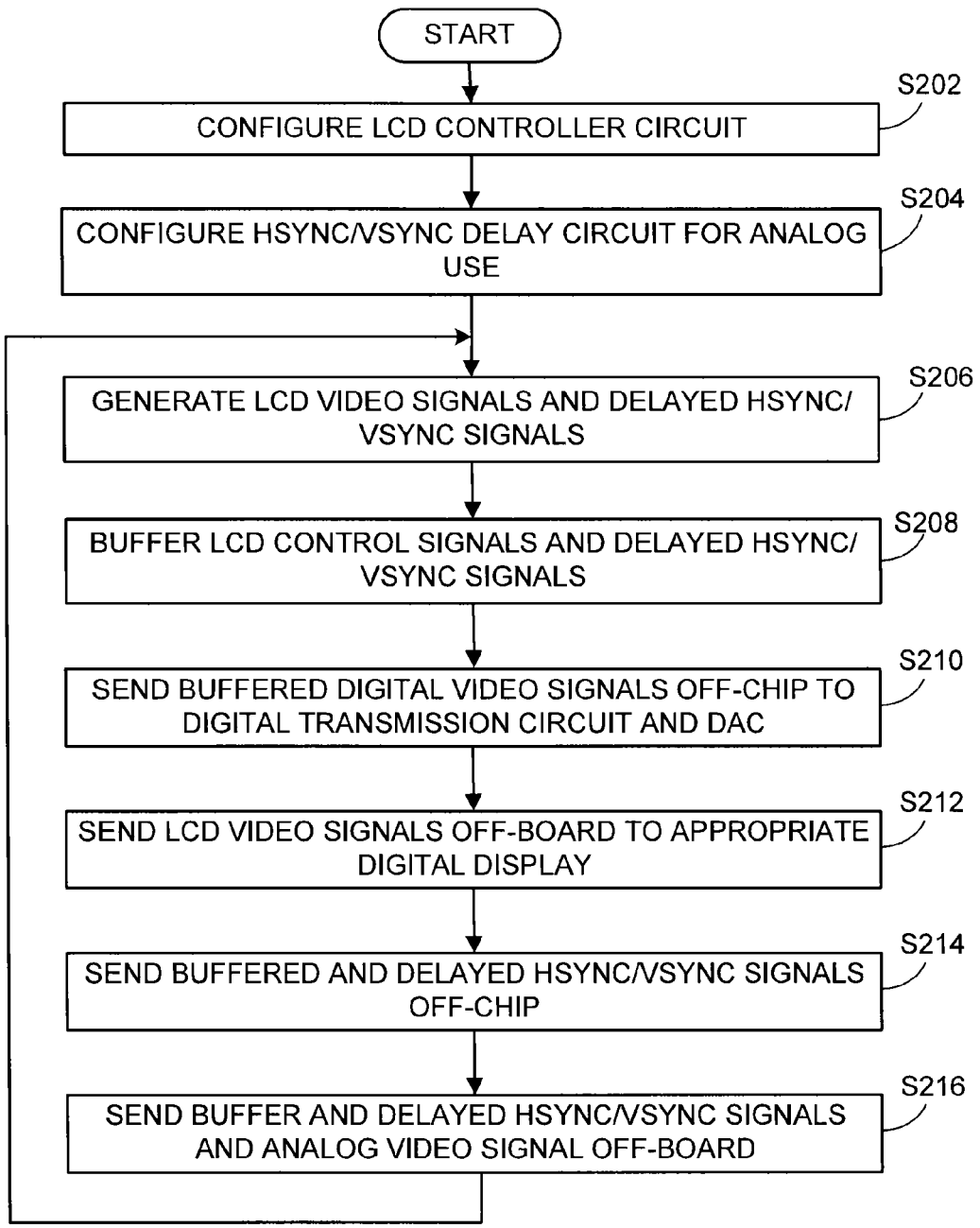
FIG. 2 is a flowchart outlining an example operation of the disclosed methods and systems for driving digital and analog displays.

FIG. 2 is a flowchart outlining an example operation of the disclosed methods and systems for driving digital and analog displays. While the below-described steps are described as occurring in a particular sequence for convenience, it is noted that the order of various steps may be changed from embodiment to embodiment. It is also noted that various disclosed steps may occur simultaneously or be made to occur in an overlapping fashion.

The process starts in step S202 where an LCD controller circuit located on an SoC is configured to generate an appropriate set of digital video signals including pixel data, a pixel data valid signal, a pixel data clock signal, a first VSYNC signal, and a first HSYNC signal. Next, in step S204, a digital delay circuit located on the SoC is configured (based on a delay control signal) to receive the first VSYNC signal, the first HSYNC signal, and the pixel data clock to generate delayed VSYNC and HSYNC signals. Control continues to step S206.

In step S206, the digital video data and the VSYNC and HSYNC signals mentioned in step S202 are generated by the LCD controller circuit while the delayed VSYNC and HSYNC signals mentioned in step S204 are generated by the digital delay circuit. Next, in step S208, the delayed VSYNC and HSYNC signals are received, buffered and conditioned by a first power rail circuit on the SoC to generate conditioned VSYNC and HSYNC signals that electrically comply with the VGA or similar analog standard, while the digital video signals generated by the LCD controller circuit are received, buffered and conditioned by a second power rail circuit to generate conditioned video signals that electrically comply with the requirements of transmission circuitry for the DVI standard, the HMDI standard, or perhaps another digital video standard. Control continues to step S210.

In step S210, the digital video signals of the second power rail are sent to the appropriate digital video transmission circuit necessary to drive a digital display, as well as to a DAC so as to provide an analog video signal compliant with the VGA or another video standard. Next, in step S212, the digital video transmission circuit sends its output signals off-board to an appropriate digital display system. Control continues to step S214.

In step S214, the conditioned and delayed HSYNC and VSYNC signals generated in step S208 are sent off-chip, i.e., off the SoC to the PCB containing the SoC. Next, in step S216, the conditioned and delayed HSYNC and VSYNC signals, along with the analog video signal of step S210, are sent off-board to an appropriate analog display. Control then jumps back to step S206 whereby steps S206-S216 may be repeated as desired.

The flowchart of FIG. 2 outlines a number of steps for the generation of both analog and digital video signals. However, the various steps of FIG. 2 are not necessarily conducted in the sequential order as suggested by the flowchart. While the flowchart of FIG. 2 is structured in a fashion representative of a single flow for simplicity of explanation, it is noted that this flowchart can be characterized as describing two separate flows—one for digital video signal and one for analog video signals—generally operating in parallel and capable of having some common operations. Accordingly, no particular limitation should be inferred by the suggested sequence of steps of FIG. 2.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A device for driving a plurality of video devices, the device comprising:
   a controller circuit configured to drive the video devices including at least a digital interface and an analog interface and to generate digital data and synchronization signals for controlling characteristics of the digital data; and
   a delay circuit configured to variably delay the synchronization signals relative to the digital data to generate a delayed first synchronization signal and a delayed second synchronization signal, the delayed first synchronization signal and the delayed second synchronization signal compensating a delay caused by a digital-to-analog converter (DAC) converting the digital data to an analog signal.

2. The device of claim 1, wherein the DAC is external to a system on a chip (SoC) that includes the controller circuit and the delay circuit.

3. The device of claim 2, further comprising:
   a power rail circuit on the SoC, the power rail circuit being configured to receive the delayed first synchronization signal and the delayed second synchronization signal and to generate a conditioned first synchronization signal and a conditioned second synchronization signal that have functional voltage levels that are compliant with a VGA video signal.

4. The device of claim 1, wherein the delay circuit includes a delay setting so as to generate the delayed first synchronization signal and the delayed second synchronization signal, both signals being delayed so as to complement the analog signal to generate a Video Graphics Array (VGA) compliant video signal.

5. The device of claim 4, wherein the delay circuit includes a plurality of delay settings so as to delay a first synchronization signal and a second synchronization signal to complement a plurality of different types of DACs to generate a VGA compliant video signal.

6. The device of claim 1, wherein the synchronization signals have complementary timings compliant with at least one of a Digital Visual Interface (DVI) signal and a High-Definition Multimedia Interface (HDMI) signal.

7. The device of claim 1, further comprising:
   a power rail circuit on a system on a chip (SoC) that includes the controller circuit and the delay circuit, the power rail circuit configured to receive a first synchronization signal and a second synchronization signal and to generate a conditioned first synchronization signal and a conditioned second synchronization signal that have respective functional voltage levels that are compliant with at least one of a DVI driving circuit and an HDMI driving circuit.

8. The device of claim 7, further comprising:
   at least one of the DVI driving circuit and the HDMI driving circuit being external to the SoC and being configured to receive the first synchronization signal and the second synchronization signal from the power rail circuit to drive at least one of a DVI signal transmission circuit and an HDMI signal transmission circuit, the at least one of a DVI signal transmission circuit and an HDMI signal transmission circuit being configured to receive and buffer the digital data.

9. The device of claim 1, wherein:
   the synchronization signals include a vertical synchronization (VSYNC) signal and a horizontal synchronization (HSYNC) signal; and
   the delay circuit includes a delay setting that is configured to generate a delayed VSYNC signal and a delayed HSYNC signal that are respectively delayed so as to complement the analog signal to generate a Video Graphics Array (VGA) compliant video signal.

10. The device of claim 9, further comprising:
    a first power rail circuit on a system on a chip (SoC) that includes the controller circuit and the delay circuit, the first power rail circuit configured to receive the delayed VSYNC signal and the delayed HSYNC signal to generate a conditioned VSYNC signal and a conditioned HSYNC signal that have functional voltage levels that are compliant with a VGA video signal.

11. The device of claim 10, further comprising:
    a second power rail circuit on the SoC, the second power rail circuit being configured to receive the VSYNC signal and the HSYNC signal to generate a conditioned VSYNC signal and a conditioned HSYNC signal that have functional voltage levels that are compliant with at least one of a Digital Visual Interface (DVI) driving circuit and a High-Definition Multimedia Interface (HDMI) driving circuit.

12. A method for driving a plurality of video devices, the method comprising:
    driving the video devices including at least a digital interface and an analog interface by a controller included in a system on a chip (SoC);
    generating digital data and synchronization signals corresponding to the digital data;
    converting the digital data to an analog signal;
    delaying the synchronization signals relative to the digital data to generate on the SoC a delayed first synchronization signal and a delayed second synchronization signal, the delayed first synchronization signal and the delayed second synchronization signal being operative to compensate a delay caused by the converting.

13. The method of claim 12, further comprising:
    converting, by a digital-to-analog converter (DAC), the digital data to analog form off of the SoC to derive the analog signal off of the SoC.

14. The method of claim 13, further comprising:
    using a delay setting to generate the delayed first synchronization signal and the delayed second synchronization signal that are delayed so as to complement the analog signal to generate a Video Graphics Array (VGA) compliant video signal.

15. The method of claim 14, further comprising:
    receiving, by a power rail circuit on the SoC, the delayed first synchronization signal and the delayed second synchronization signal and generating from the respective delayed first and second synchronization signals a conditioned first synchronization signal and a conditioned second synchronization signal that have respective functional voltage levels that are compliant with the VGA compliant video signal.

16. The method of claim 12, further comprising:

generating the digital data, a first synchronization signal, and a second synchronization signal, both synchronization signals respectively having complementary timings compliant with at least one of a Digital Visual Interface (DVI) signal and a High-Definition Multimedia Interface (HDMI) signal.

17. The method of claim 16, further comprising receiving and conditioning on the SoC the first and second synchronization signals and generating from the received first and second synchronization signals a first set of first and second conditioned synchronization signals that have respective functional voltage levels that are compliant with a VGA video signal; and receiving and conditioning on the SoC the first and second synchronization signals and generating from the received first and second synchronization signals a second set of first and second conditioned signals that have respective functional voltage levels that are compliant with at least one of a DVI driving circuit and an HDMI driving circuit.

18. A system, comprising:

a controller circuit configured to drive a plurality of video devices including at least a digital interface and an analog interface and to generate digital data and synchronization signals for controlling characteristics of the digital data; and a delay circuit configured to variably delay the synchronization signals relative to the digital data to generate a delayed first synchronization signal and a delayed second synchronization signal, the delayed first synchronization signal and the delayed second synchronization signal being operative to compensate a delay caused by a digital-to-analog conversion of the digital data to an analog signal.

19. The system of claim 18, further comprising:

a display panel configured to display according to a Video Graphic Array (VGA) video signal; and a digital-to-analog Converter (DAC) configured to convert the digital data to analog form to derive the VGA video signal, wherein the delay circuit is further configured to delay a first synchronization signal and a second synchronization signal to complement the digital-to-analog conversion.

20. The system of claim 18, further comprising:

a display panel configured to display according to at least one of a Digital Visual Interface (DVI) signal and a High-Definition Multimedia Interface (HDMI) signal, wherein the delay circuit is further configured to delay a first synchronization signal and a second synchronization signal to be compliant with a signal for the display panel to display.

* * * * *